(No Model.)
A. C. WICKHAM.
CULTIVATOR.
No. 506,575. Patented Oct. 10, 1893.
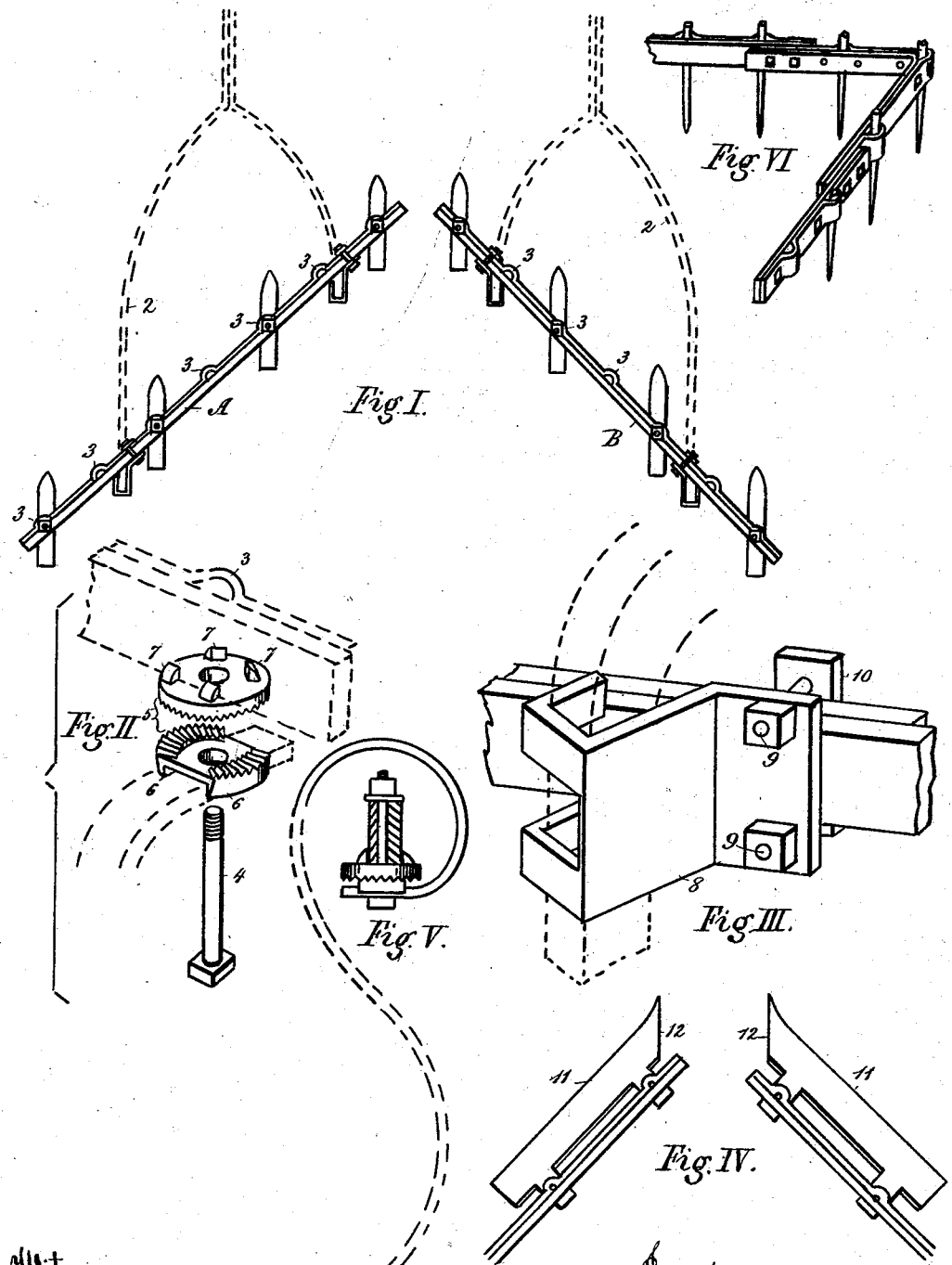

UNITED STATES PATENT OFFICE.

AMOS C. WICKHAM, OF CARTHAGE, MISSOURI.

CULTIVATOR.

SPECIFICATION forming part of Letters Patent No. 506,575, dated October 10, 1893.

Application filed May 22, 1893. Serial No. 475,150. (No model.)

*To all whom it may concern:*

Be it known that I, AMOS C. WICKHAM, a citizen of the United States, residing at Carthage, in the county of Jasper and State of Missouri, have invented a new and useful Improvement in Cultivators, which improvement is fully set forth in the following specification and accompanying drawings, in which—

Figure 1 is a plan view of my improved cultivator; Fig. 2, a detail view of the adjusting disks and their relations with the beam and the connecting bolt; Fig. 3, a detail view of the adjustable clamp which unites the drag bars and the cultivator beams; Fig. 4, a view of the machine adapted for cotton plant culture; Fig. 5, a detail view of a spring tooth, and Fig. 6, a view of the machine when converted into an ordinary harrow.

My invention pertains to improvements in agricultural implements for the culture of various growing plants including cotton, corn and other crops which are planted in rows.

My special object is to improve the construction and increase the efficiency of the device described in my Patent No. 468,081, issued February 2, 1892.

The distinguishing features of this invention and its several advantages will be readily perceived by referring to the accompanying drawings in which A and B designate the beams which are set at the desired angle and coupled to an ordinary cultivator frame by bifurcated drag bars 2. The beams are preferably composed of duplicate metal bars, one bar of each pair being crimped transversely at regular intervals to form apertures 3 to receive bolts 4, by which any desired form of cultivator tooth, having a flat shank, may be securely fastened to the beam. It is well known that machines of this class, when provided with curved teeth, have hitherto proved defective for the want of efficient means to adjust the teeth directly in the line of draft. When not so adjusted, the machine will inevitably drift sidewise instead of moving directly forward. The consequences are an increased draft and damage to the plants. I obviate this disadvantage by an adjusting device 5 which is composed of two disks, the lower one being provided with depending jaws 6 which embrace the shank of the tooth, the upper one with studs 7 adapted to engage the outer sides of the beam, and the interior faces having interlocking teeth or notches. By this means, the cultivator teeth may be readily and accurately set in correct line and when the disks are clamped by the bolt 4, the teeth cannot be shifted out of their position by any force to which they may be exposed.

The horizontal position of the beams may be varied as desired by means of a clamp 8 by which the beam is attached to the drag bar. These clamps are made of malleable metal in the form shown in the drawings and are provided with fingers which grasp the downwardly bent rear end of the drag bar and clamp it firmly against the rear side of the beam, where it is held in position by screw bolts 9. It will be understood that the heads of the bolts are engaged by a bar 10 which bears against the front side of the beam and that the body of the clamp does not come into contact with the rear side. It follows that the entire pressure of the clamp is brought to bear solely upon the drag bar. By this means the inner or converging ends of the beams may be elevated to any desired degree and thereby adapt the machine to the cultivation of crops which are planted on ridges. It will be observed by simply reversing this adjustment and elevating the rear ends of the beams, the machine may be employed for cultivating listed corn or other crops which are planted in furrows. This implement will be found especially serviceable in the operation of "barring off" cotton plants. In order to adapt the machine for that purpose, two narrow shares 11 having vertical fins or cutting edges 12 are attached to the fore ends of the beams in place of the ordinary teeth. The shares are set to run sufficiently deep to cut and remove grass and weeds from the sides of the rows but not so deep as to injure the roots of the plants, while the rear teeth are working at full depth and thoroughly stirring the soil between the rows.

In mellow, well cultivated soil, the curved tooth as shown in Fig. 1 is preferable but in ground which contains roots or other obstructions a spring tooth, see Fig. 5, should be employed.

The machine may be converted into an ordinary tri-angular harrow by attaching a V shaped extension to the fore ends of the beams and inserting a set of plain straight teeth as shown in Fig. 6.

What I claim as new is—

In a cultivator, the combination with the carrying frame and drag bars, of the herein described beams composed of duplicate bars constructed and arranged to form apertures for the cultivator teeth, the disks provided with interlocking notches adapted to adjust and hold the teeth in the line of draft and the adjustable clamp adapted to grasp the drag bars and regulate the position of the beams thereon, substantially as and for the purposes herein set forth.

In testimony that I claim the foregoing I have hereunto set my hand, this 6th day of May, 1893, in the presence of witnesses.

AMOS C. WICKHAM.

Witnesses:
I. W. SCHURMAN,
BEN YOUNG.